D. W. PARKER.
STONE SAWING MACHINE.
APPLICATION FILED JAN. 17, 1916.
1,263,461.
Patented Apr. 23, 1918.
2 SHEETS—SHEET 2.
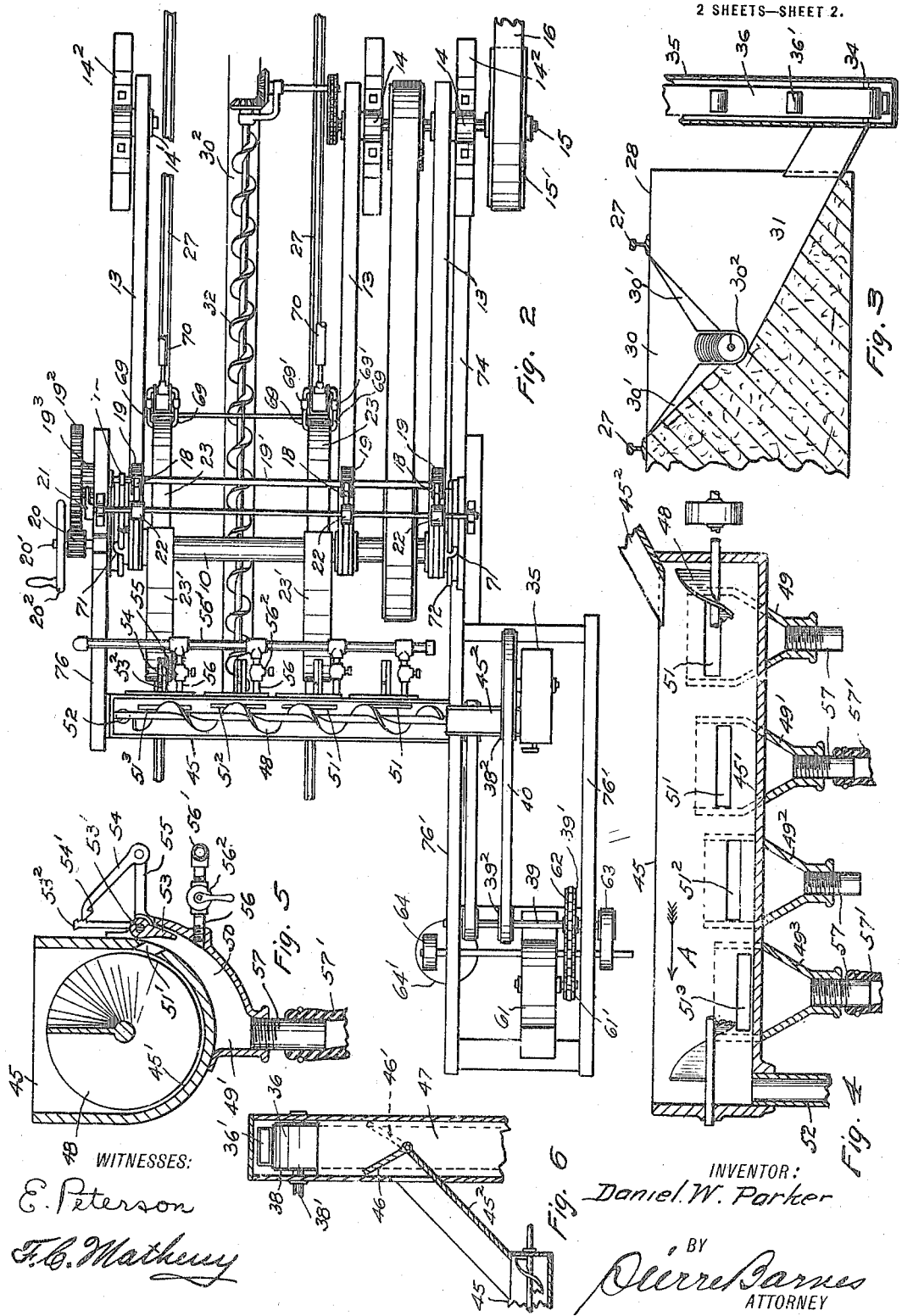
WITNESSES:
E. Peterson
F. C. Matheny
INVENTOR:
Daniel W. Parker
BY
Pierre Barnes
ATTORNEY

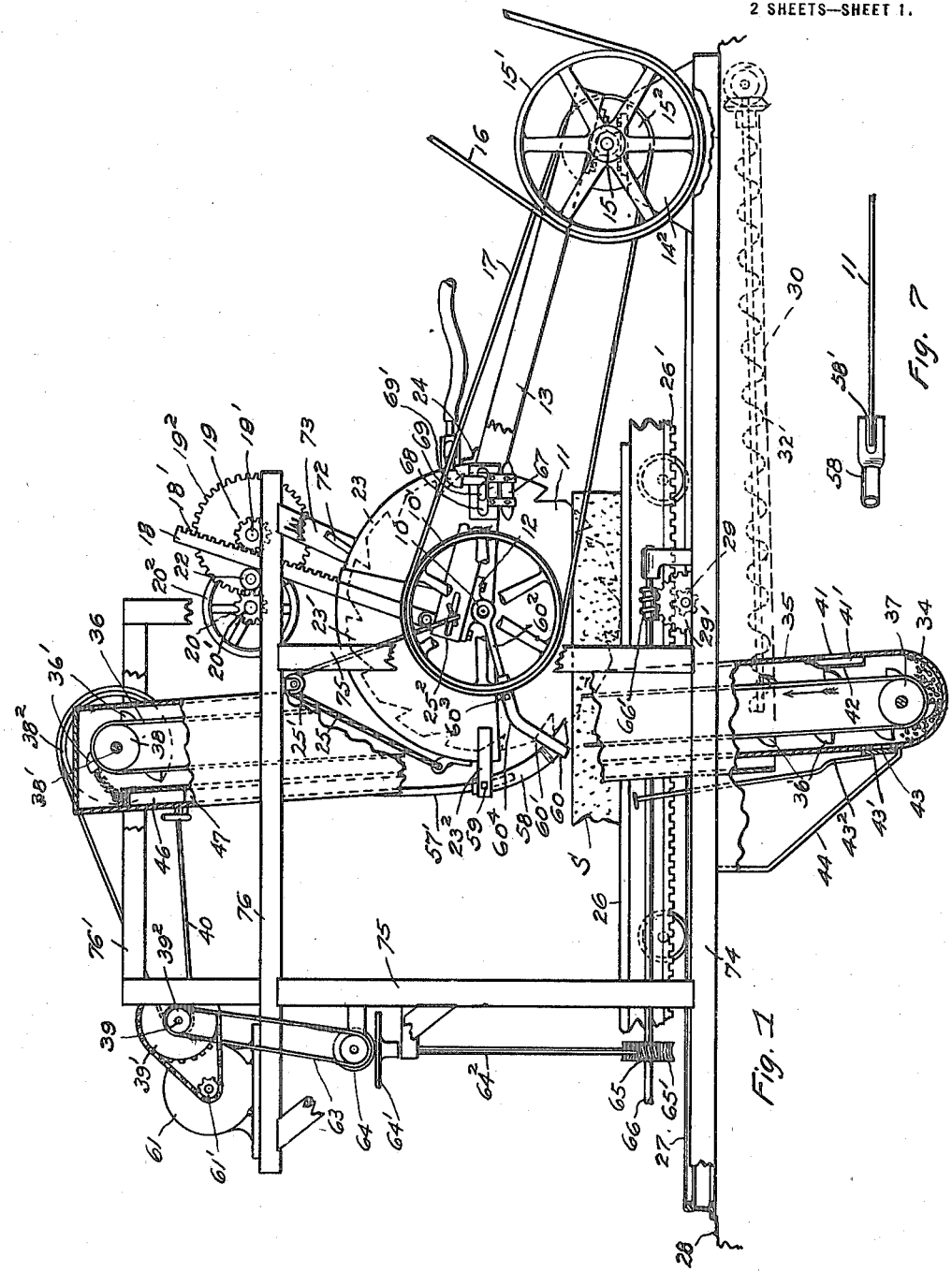

UNITED STATES PATENT OFFICE.

DANIEL W. PARKER, OF EVERETT, WASHINGTON, ASSIGNOR TO THE PARKER ROTARY STONE SAW COMPANY, A CORPORATION OF NEVADA.

STONE-SAWING MACHINE.

1,263,461.  Specification of Letters Patent.  Patented Apr. 23, 1918.

Application filed January 17, 1916. Serial No. 72,421.

*To all whom it may concern:*

Be it known that I, DANIEL W. PARKER, a citizen of the United States, residing at Everett, in the county of Snohomish and State of Washington, have invented certain new and useful Improvements in Stone-Sawing Machines, of which the following is a specification.

This invention relates to stone sawing machines, and is in the nature of an improvement in the machines illustrated and described in U. S. Patent No. 1,095,415, issued to me May 14, 1914.

The object of my improvement is mainly to perfect the apparatus for circulating and supplying an abrasive material, such as chilled steel shot, and distributing the same to a saw or saws in quantities to enable them to perform their duty in a rapid and efficient manner.

A further object is to provide means for cleaning the shot from foreign matter such as stone-dust and means for retaining the shot in a serviceable condition when unemployed.

A still further object is the provision of an improved form of nozzle for the feeding of the shot to a saw, and in the devices for regulating the action to obtain most effective results with an economical use of the shot.

With these and other ends in view, the invention consists in the novel construction, adaptation and combination of parts, as will be hereinafter described and claimed.

In the accompanying drawings, Figure 1 is a view partly in side elevation and partly in vertical longitudinal section of a stone-sawing machine embodying my improvements. Fig. 2 is a plan view of the same with the carriage and other parts omitted for the sake of clearness. Fig. 3 is a transverse sectional view through the foundation of the machine. Fig. 4 is a vertical sectional view taken lengthwise of the transverse conveyer or distributing trough with the spiral conveying agent partly broken away. Fig. 5 is a sectional view through Figs. 2 and 4. Fig. 6 is a detail transverse sectional view of the upper end of the elevator casing to illustrate the connections therewith of the distributing trough and the reservoir duct. Fig. 7 is a fragmentary detail plan view of a saw and the shot feed nozzle therefor.

The sawing machine proper comprises an arbor 10 carrying one or more saws 11 and journaled in boxes 12 at the free end of a vibratory frame formed of a plurality of members 13 and fulcrumed to boxes 14 and $14^1$ supported upon blocks $14^2$ at the rear end of the machine. Extending through the boxes 14 is a shaft 15 which is rotated, as by a power-driven belt 16, and a pulley $15^1$ on the shaft.

17 represents an endless belt passing about pulleys $15^2$ and $10^1$ upon said shaft and the arbor for driving the latter.

Pivotally connected to the members 13 of said vibratory frame are suspension rods 18 formed with rack teeth $18^1$ to engage with toothed pinions 19 provided on a superposed transverse shaft $19^1$. This shaft is rotated to effect the elevation of the saws by tilting the free end of said frame upwardly by means of gears $19^2$ and 20 from a stub-shaft $20^1$ which may be actuated by a hand wheel $20^2$ or otherwise.

$19^3$ represents a ratchet wheel on shaft $19^1$ for engagement with a pawl 21 to secure the oscillatory frame against lowering below what is necessary to make a predetermined cut with the saws, yet allowing the frame to swing upwardly when the work is fed too rapidly to the saws.

Wheels denoted by 22 are provided for the suspension rods 18 to prevent their being disengaged from the respective pinions 19.

The saws 11 are each guarded by a hood consisting of two elements 23 and $23^1$ whereof the former is fixedly secured to the oscillatory frame as by a bar 24. The other element $23^1$ is connected for rotary movement circumferentially of the respective saw and is held in adjusted positions by means of a rope 25 (Fig. 1) having one end attached to the hood element, thence passing about a sheave $25^1$ and has its other end secured to a cleat $25^2$ secured to a frame member 13, as shown in Fig. 1.

A stone, as indicated by S in Fig. 1, which is to be cut, is supported upon a carriage 26 having wheels mounted on track rails 27 secured to the machine foundation 28. Said carriage is propelled to feed the stone to the saws by any suitable mechanism as, for example, power-driven toothed pinions 29 operating in racks as $26^1$ provided on the underside of the carriage body.

Coöperating with the above described mechanism is my improved means for regulating the action of the stone-abrading medium, or shot, and which will now be described.

In the foundation 28 which is desirably constructed of concrete, is provided a longitudinal gutter 30 having sloping sides $30^1$, Fig. 3, and inclined downwardly to about the mid-length of the machine, whereat it is connected to the upper end of a transversely arranged channel 31. In a depression $30^2$ of said gutter is positioned a so-called screw conveyer 32 which serves to carry the shot into the channel 31 and through which the shot accompanied by stone-dust and water is carried into the lower or boot end 34 of an elevator casing 35. The elevator 36 is preferably of the endless belt type having attached buckets $36^1$ and passing about an idler wheel 37 at the bottom, and a driving wheel 38 at the top. Said driving wheel is mounted on a shaft $38^1$ and is driven from a counter-shaft 39 by a belt 40 passing about pulleys $38^2$ and $39^2$ on the respective shafts.

The travel of the buckets through the material received from said channel in the boot 34 agitates the mass to effect the washing of the shot, which is then raised by the elevator buckets while the remaining mixture of rock-dust and water escapes through an outlet 41 provided at a distance above the lower end of the elevator casing.

42 represents a partition spaced from the casing wall which is provided with said outlet to afford a passageway $41^1$ open at the bottom through which the muddy water may escape without surging, which would tend to carry some shot therewith.

Communicating with its interior near the bottom of said casing by a passage 43, is a water-tight receptacle 44 which serves as a reservoir for shot when unemployed. For closing said passage I provide a gate $43^1$ which, as illustrated, is controlled by a rod $43^2$.

$45^2$ is a chute leading from about the mid-width of the elevator casing into a transversely arranged trough 45 for the delivery of shot thereto from the elevator. Within the latter and hingedly connected to the end of said chute, is a leaf 46 upon which the elevated shot is deposited and serves, when in the dotted line position $46^1$ (Fig. 6), to direct the shot into the chute $45^2$ but when moved into the position in which shown by full lines in the view, will direct the shot into a duct 47 extending down into said reservoir.

The trough 45, as best shown in Figs. 4 and 5, is formed with a semi-circular bottom $45^1$ corresponding to the diameter of the spiral thread or flight of a screw conveyer 48 provided within the trough to cause the shot to be moved therein, as indicated by arrow A.

Depending from said trough are a number of funnel shaped hoppers, 49, $49^1$, etc., which communicate with the inside of the trough by passages such as 50, Fig. 5, and shot outlets 51, $51^1$, etc., for the respective hoppers. These outlets are arranged at different elevations, the one nearest the chute or receiving end of the trough being the highest, the next one at a lower level, and so on to the remote outlet.

By such devices the shot is distributed to the several outlets in its travel through the trough by the upper portion of the shot escaping through the successive outlets and the surplus of shot is delivered into a waste pipe 52 whence it is dischaged into the gutter 30.

For each of the shot outlets is a door 53 hinged, as at $53^1$, Fig. 5, and provided with an arm $53^2$ whereby the respective door may be held in open position through the instrumentality of a finger 54 hingedly connected to a bracket arm 55 extending from said trough. These fingers are each formed with a hook $54^1$ for engagement over the end of the associated door arm $53^2$ to releasably hold a door in closed position when it is desired to prevent the discharge of shot into a selected hopper, as when one or more of the hoppers are unemployed.

Extending into the various passages 50 and adjacent to the respective trough outlets are branches 56 of a water-supply pipe $56^1$. Included in said branches are cocks $56^2$ for shutting off or regulating the quantities of water admitted through the respective passages into the different hoppers.

Connected with each such hopper is a nipple 57 whereto may be coupled the end of a flexible tube $57^1$ whose other end extends loosely into a pipe or nozzle 58 whose office is to deliver shot and water in front of a saw and into the kerf made thereby. This nozzle is desirably curved and at its discharge end a relatively narrow orifice or slot $58^1$ (Fig. 7) is provided, to allow the saw to extend into the same.

Nozzle 58 is supported at its upper end by being engaged by the ends of two axially alined set screws 59, but one of which is shown (Fig. 1) extending from diametrically opposite sides through an eye of an arm $28^2$ secured to a hood element $28^1$.

The lower end of a nozzle extends through a sleeve 60 provided on an end of the tubular member $60^1$ of an arm whose other member $60^2$ extends telescopically therein and secured together by a set screw $60^3$. The arm member $60^2$ is pivotally connected by an eye engaging the arbor or to said oscillatory frame so as to be swung about the axis of the saw arbor.

The position of a nozzle 58 may be regulated as to height by securing the same at selected heights in arm $28^2$ through the agency of the set screws 59 which thereupon act as a pivotal connection for the upper end of the nozzle to allow the lower end of the same to be swung radially of the adjacent saw by extending or lengthening the two-part arm 60¹—60² thereof. Such adjustments of the nozzle are required to present its orifice in proximity to the stone at various depths of cutting and also to compensate for the decreasing diameters of saws through wear.

One of the members of an arm is bent, as at 60⁴, so as to allow the arm to overhang a stone and present the nozzle to the cut during the completion of the work.

61 represents a motor for driving the aforesaid countershaft 39 through the medium of belt 62 and pulleys 61¹ and 39¹. The countershaft 39 may be also be utilized to transmit power to operate the carriage 26 as through the agency of the following named mechanism; belt 63 to drive a wheel 64 which frictionally drives a wheel 64¹ on an upright shaft 64² to drive through the medium of worm 65 and wheel 65¹ a horizontal shaft 66 which carries a worm 66¹ to drive a worm-wheel 29¹ on the shaft 29 of the pinions 29.

Brushes, such as indicated by 67, (Fig. 1) secured to hood members 23, are utilized to sweep any of the shot and dirt which may adhere to a saw. In proximity of a brush and directed to deliver water through hood slots, as 68, against opposite sides of a saw, are nozzles 69 of water supply pipes 70. Said nozzles are connected by pipe fittings 69¹ to enable the nozzles to be swung about vertical axes so as to adjust the same to the saw when it becomes worn. These nozzles coöperate with the brushes 67 to not only clean the saws, but to wipe and wash the shot therefrom which then fall into the gutter 30.

The outer members of the saw-carrying or oscillating frame have secured thereto guide-blocks 71 which slide upon trackways 72 secured to posts 73 of the machine framework to obviate any lateral swaying of the oscillatory frame.

The machine frame may be constructed in any suitable way to afford the necessary strength and rigidity as, for example, with sills 74 on the foundation, upon which are posts 75 supporting the superstructure girders 76 and 76¹.

The shot distributer is adapted to accommodate a selected number of saws which are supplied through the various hoppers 49—49³ and the surplus shot is returned through waste pipe 52 to the gutter 30. When any of the hoppers are not required, the respective gate 53 is closed and the pipe connection for that hopper outlet is desirably removed.

When operative, the shot supplied to a hopper is accompanied with a quantity of water admitted through inlet pipe 56 and thence is conducted by a hose connection 57 and a nozzle 58 by which it is delivered in front of a saw. This nozzle being pivoted at its upper end and having its lower end connected to a two-part radius rod 60¹—60², is not only adjustable as to length to suit various diameters of saws but is bent, as it were, so as to most efficiently deliver the shot, as before explained.

The shot from the stone falls into gutter 30 and is therefrom delivered to the way 31 and thence to the elevator by which it is raised to be delivered selectively to the distributing trough 45 or deposited into duct 47 whence it falls in the reservoir 44.

The shot is thus shunted into the reservoir when the cutting of a stone is completed or the operation of a saw or the saws discontinued, as at the expiration of a day's work. Said reservoir is made watertight and the shot deposited therein is submerged in water to obviate any danger of the shot rusting and adhering together into a hard and useless mass.

When additional shot is likely to be required during any operation or run, it should be put in circulation before the shot stored in the reservoir is returned to the elevator so that the new shot may first become worn to approximately the size of that previously used, whereupon the door 43¹ of the reservoir is opened to allow such stored shot to enter the elevator to contribute in the work.

By such regulation and by the use of shot of substantially uniform size, I avoid making unnecessarily wide kerfs and economize both in time and consumption of shot.

The invention as embodied in the drawings is durable in construction, requires but little attention, and marks an advance in the art.

What I claim, is—

1. In a stone-sawing machine, the combination with a receptacle into which shot, water and abraded particles of stone are collected, and a distributer comprising a trough having discharge openings and a conveyer operating in the trough, of an elevator to raise the shot from said receptacle, an elevator casing provided near its upper end with a shot discharge opening leading to said distributer and a duct communicating with the lower end of the casing, adjustable means provided in said casing for directing the shot either to the distributer or to said chute, said casing being provided with a dirt discharge outlet at a distance above its lower end, a guard plate provided in the casing between the elevator and said outlet to provide an upwardly extending passage communicating with said outlet, said elevator serving to agitate the accumulation of water, stone and particles and shot in the lower end of the casing to clean the shot, which is thereupon elevated while the residue of such accumulation progressively ascends through said passage to escape through said outlet.

2. In a stone-sawing machine, a shot distributer, a receptacle into which shot and water from a stone is collected, an elevator, a casing therefor, means to conduct the material collected in said receptacle to said casing, a shot reservoir communicating with the lower end of said casing, a door for opening and closing the communication between the casing and said reservoir, a duct leading from said casing into the reservoir, a chute extending from the elevator to said distributer, and means whereby the shot may be delivered selectively into either the duct or said chute.

3. In a stone-sawing machine, the combination with a circular saw, and means to regulate the elevation of the saw, of a shot-hopper disposed at a higher elevation than said saw, a shot-discharge nozzle, a pipe connection between said hopper and the nozzle, and devices operatively connected to the nozzle and actuated by the aforesaid means whereby the nozzle is caused to rise or fall respectively as the saw is lowered or raised.

4. In a stone-sawing machine, the combination with a circular saw, means for rotating said saw, and means to regulate the elevation of the saw, of a shot-hopper disposed at a higher elevation than said saw, a shot-discharge nozzle, a pipe connection between said hopper and the nozzle, a support for said nozzle, means to regulate the elevation of said support to adjust the nozzle to various heights relatively to the saw, a connection for said nozzle and pivotally movable about the axis of said saw, said connection being provided with a bend to enable the nozzle to be utilized to deliver shot either against the end or from above a stone.

5. In a stone-sawing machine, the combination with a circular saw, means for rotating said saw, and means to regulate the elevation of the saw, of a shot-hopper disposed at a higher elevation than said saw, a shot-discharge nozzle provided with a slot into which said saw extends, a pipe connection between said hopper and the nozzle, a support for said nozzle, means to regulate the elevation of said support to adjust the nozzle to various heights relatively to the saw, an extensible connection for said nozzle and pivotally movable about the axis of said saw whereby the position of the nozzle outlet may be adapted to saws of different diameters, said extensible connection being provided with a bend to enable the nozzle to be utilized to deliver shot either against the end or from above a stone.

6. In a stone-sawing machine, the combination with the saw, means to rotate the same, and a shot circulating and feeding system, of means to clean the saw of shot or other material adhering thereto, said means consisting of a water supply pipe, means to connect said pipe to the saw to be movable vertically in unison therewith, and water-discharge connections for said pipe and arranged to have the outlets thereof adjustable to deliver the water against opposite sides of the saw at various angles with respect thereto.

7. In a stone sawing machine, the combination with a receptacle into which shot is collected, and a shot distributer, of an elevator, an elevator-casing communicating with said receptacle, said casing being provided adjacent to its top with a shot outlet, a chute connecting said outlet with said distributer, a duct leading from the casing in proximity to said outlet to said receptacle, and means provided in the casing for directing shot raised by the elevator selectively into said duct or into said chute.

8. In a stone sawing machine, the combination with a receptacle into which shot is collected, and a shot distributer, of an elevator, an elevator casing communicating with said receptacle, said casing being provided adjacent to its top with a shot outlet, a chute connecting said outlet with said distributer, a duct leading from the casing in proximity to said outlet to said receptacle, means provided in the casing for directing shot raised by the elevator selectively into said duct or into said chute, and a gate between said receptacle and the casing.

Signed at Everett, Washington, this 24 day of Dec., 1915.

DANIEL W. PARKER.

Witnesses:
  MIKE MCDERMOTT,
  N. SHAKESPEARE.